United States Patent [19]
Ward et al.

[11] Patent Number: 5,283,555
[45] Date of Patent: Feb. 1, 1994

[54] DIMENSIONAL CONTINUOUS MOTION CONTROLLER

[75] Inventors: Peter Ward, Kingston, N.Y.; David Ward, Apex, N.C.

[73] Assignee: PanDigital Corp., Kingston, N.Y.

[21] Appl. No.: 842,778

[22] Filed: Feb. 21, 1992

Related U.S. Application Data

[63] Continuation of Ser. No. 503,999, Apr. 4, 1990, abandoned.

[51] Int. Cl.$^5$ ............................................. G09G 3/02
[52] U.S. Cl. .................................... 345/156; 400/475; 74/471 XY
[58] Field of Search ........................ 340/706, 709, 710; 273/85 B, 85 D, 85 Z, 85 F, 85 G, 148 B, 438; 400/475; 200/86.5; 74/471 XY; 250/221

[56] References Cited

U.S. PATENT DOCUMENTS

| | | | |
|---|---|---|---|
| 4,092,532 | 5/1978 | Hayes | 340/710 |
| 4,719,455 | 1/1988 | Louis | 340/709 |
| 4,879,556 | 11/1989 | Duimel | 340/709 |
| 4,965,417 | 10/1990 | Massie | 200/86.5 |

FOREIGN PATENT DOCUMENTS 2038597 7/1980 United Kingdom .

OTHER PUBLICATIONS

"Technical Disclosure Bulletin", IBM, 4, 1986, vol. 28.

*Primary Examiner*—Alvin E. Oberley
*Assistant Examiner*—Regina Liang

[57] ABSTRACT

A stationary flat horizontal support member has an active circular area with a center point which defines a zero point of intersecting orthogonal X and Y axes. A first flat horizontal plate is disposed above and spaced from the member. The first plate is movable along either or both X and Y axes which are vertically aligned with the corresponding X and Y axes of the member. The first plate has an active circular area with a center and having a home position at which the center of the first plate is vertically aligned with the center point. The first plate is supported above the member in such manner that the first plate can be moved and held in an position with respect to either one or both of the X and y axes by an operator in an almost frictionless manner. Once the operator releases the hold, the first plate is automatically returned to zero position. A first dispacement signal monatonically related to the displacement of the center of the first plate from the center point of the member along the X axis and a second displacement signal monatonically related to the displacement of the center of the first plate from the center point of the member along the Y axis are both produced.

12 Claims, 6 Drawing Sheets

DIMENSIONAL CONTINUOUS MOTION CONTROLLER

This is a continuation of application Ser. No. 07/503,999 filed on Apr. 4, 1990, now abandoned.

BACKGROUND OF THE INVENTION

Many computers use a hand operated pointer device such as a mouse, trackball or joystick to manipulate graphics, menus, windows and the like in combination with a keyboard. Since the user employs both the device and the keyboard, it is necessary to move a hand back and forth between keyboard and device, a time consuming and awkward operation.

If such devices could be operated using a foot rather than the hand of the operator, this operation could be eliminated. However, the inventors found that no known device could be successfully operated by foot. The mouse, conventionally supported on a pad, initially functioned well until the mouse ran off the pad, with no way for the operator to pick it up without using his hand. The pad and mouse became dirty and unusable quickly unless frequent cleaning steps were employed. The trackball became clogged with dirt and inoperative almost immediately during use. The joystick was not adaptable for foot operation.

The present invention is directed toward a new type of device, a dimensional continuous motion controller, which can be easily operated either by hand or by foot and, when operated by foot, eliminates the awkward and time consuming hand operation described above.

SUMMARY OF THE INVENTION

It is an object of the present invention to provide a new device, a dimensional continuous motion controller, which can be easily operated either by hand or by foot, and when operated by foot, enables a computer operator to continuously operate the keyboard and the device, either sequentially or successively, while eliminating awkward and continuous hand operations.

Another object is to provide a new device, a dimensional controller, which operates on the principal of acceleration rather than proportional physical displacement, whereby the object moves continuously without corresponding continuous motion of the controller.

Still another object is to provide a new device, a dimensional controller, which does not require continuous movement of the controller to produce continuous motion of the pointer, but rather requires a single positioning action of the controller to produce such continuous motion.

These and other objects and advantages of the invention will either be explained or will become apparent hereinafter.

In accordance with the principles of the invention, the dimensional controller may be used for one, two or three dimensional control actions.

For two dimensional control action, the controller employs a stationary flat horizontal support member having an active circular area with a center point which defines a zero point of intersecting orthogonal X and Y axes.

A first flat horizontal plate is disposed above and spaced from the member. The first plate is movable along either or both X and Y axes which are vertically aligned with the corresponding X and Y axes of the member. The first plate has an active circular area with a center and having a home position at which the center of the first plate is vertically aligned with the center point.

First means supports the first plate above the member in such manner that the first plate can be moved and held in an position with respect to either one or both of the X and Y axes by an operator in an almost frictionless manner. Once the operator releases the hold, the first plate is automatically returned to home position.

Second means coupled to both the first plate and the member produces a first dispacement signal which is monotonically related to the displacement of the center of the first plate from the center point of the member along the X axis and a second displacement signal which is monotonically related to the displacement of the center of the first plate from the center point of the member along the Y axis.

Additional means are responsive to the first signal to produce a third acceleration signal monotonically related to an acceleration value proportional to the amount of displacement along the X axis and are also responsive to the second signal to produce a fourth acceleration signal monotonically related to an accelation value proportional to the amount of displacement along the Y axis. When the first plate is returned to home position, all signals have a zero value.

When the controller is to be used with a computer to move a cursor displayed on a monitor screen from one point to a second point, the operator, using hand or foot operation, places the first plate in a position to describe a straight line path between the two points, and holds the plate in this position until the pointer has moved along this path from one point to the second point. When the cursor has reached to the second point, the operator releases the plate. The plate returns to home position, all controller signals attain zero values, and the pointer remains at the second point.

If desired, the controller described above can be used for one dimensional control action by using on-off switches or other means to eliminate either one of the first and second displacement signals and the corresponding one of the third and fourth acceleration signals, whereby the remaining signals relate only to movement in a selected one of the X and Y axes.

For three dimensional control action, the two dimensional structure described above is augmented in the following manner.

A second flat horizontal plate is disposed above and spaced from the first plate. The second plate is freely movable in a horizontal plane along either or both X and Y axes which are vertically aligned with the corresponding X and Y axes of the member. The second plate has an active circular area with a center and is rotatable about a vertical axis, the Z axis, which extends through the center of the second plate. The second plate having a home position at which the center of the second plate is vertically aligned with the center point and at which the angle of rotation is at 0 degrees.

A vertical spindle interconnects the centers of the first and second plates, the second plate being rotatable about the spindle, the first plate being non-rotatable about the spindle. Consequently, movement of the second plate along either or both X and Y axes produces like movement in the horizontal plane of the first plate but rotation of the second plate about the Z axis produces no rotation of the first plate.

The same almost frictionless action is employed in both two and three dimensional control actions. However, for three dimensional control action, the second plate, rather than the first plate, is moved by the operator and first, second and third displacement signals respectively responsive to the combined linear and rotational movement are produced.

The first positional signal is monotonically related to the displacement of the center of the second plate from the center point of the member along the X axis. The second positional signal is monotonically related to the displacement of the center of the first plate from the center point of the member along the Y axis. The third positional signal is monotonically related to the degree of angular rotation of the second plate about the Z axis as measured from the home position.

In the same manner as before, fourth, fifth and sixth acceleration signals are produced. The fourth acceleration signal is monotonically related to an acceleration value proportional to the amount of displacement of the second plate along the X axis. The fifth acceleration signal is monatonically related to an acceleration value proportional to the amount of displacement of the second plate along the Y axis. The sixth acceleration signal is monotonically related to an acceleration value proportional to the degree of angular rotation of the second plate about the Z axis.

The various signals are produced when the operator appropriately positions the second plate and holds it in position. When the operator hold is released, the plates return automatically to home position, and all signals attain zero values.

Three different parameters of computers or other apparatus can be controlled in this manner.

DETAILED DESCRIPTION OF PREFERRED EMBODIMENTS

Figure 1:
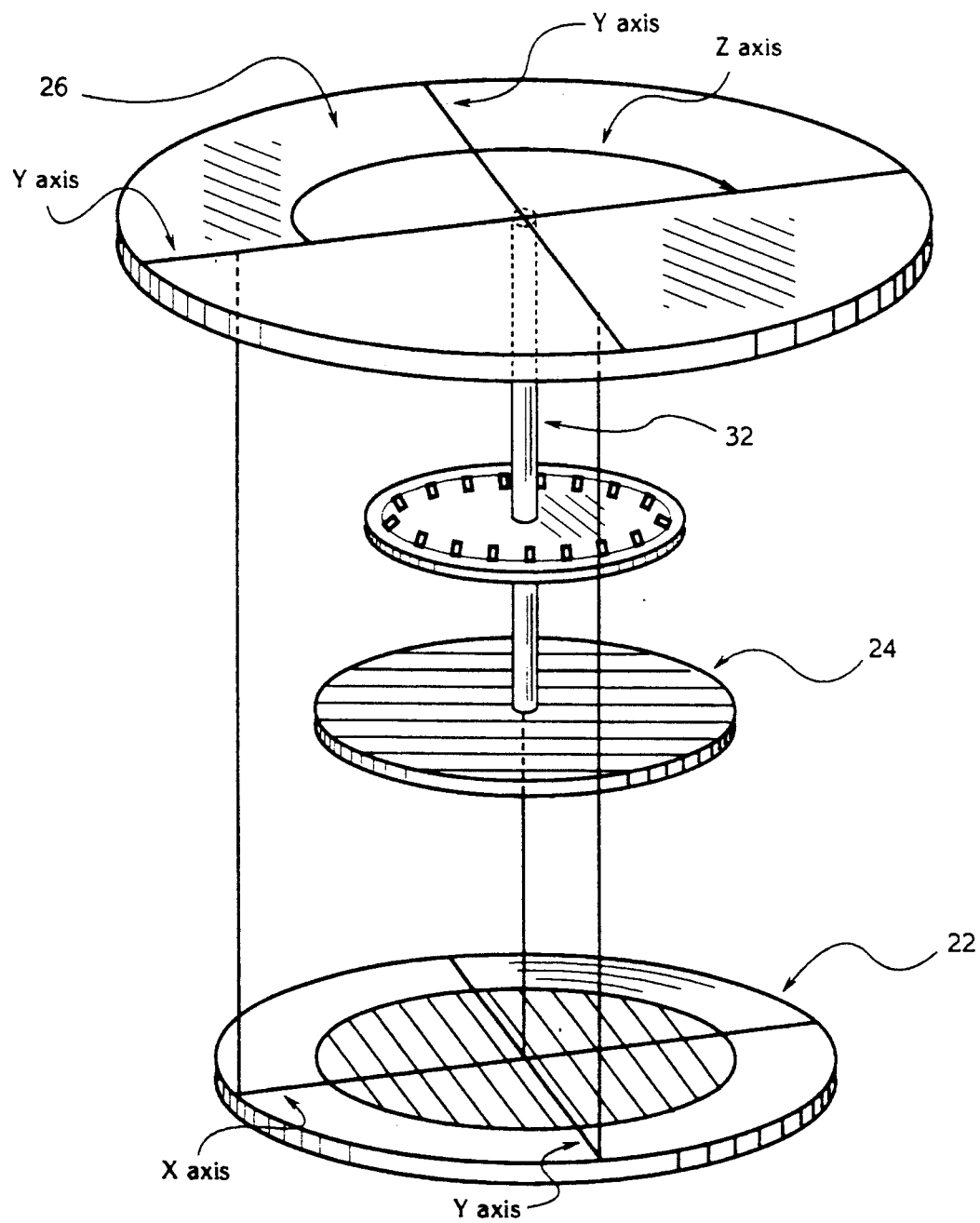
FIG. 1 is a perspective diagramatic view of two movable plates, stationary member, and related structure as used in a preferred embodiment of the invention.

Referring now to FIG. 1, a horizontal top plate 26 is movable in a horizontal XV plane in any direction with respect to the surface of a bottom stationary member 22. Another horizontal plate 24 is disposed between plate 26 and member 22. The plates and members are circular and, as will be explained below, when the plates are in the home position, their centers are vertically aligned with the center of member 22. A vertical spindle 32 is connected between the centers of plates 26 and 24. Plate 26 is freely rotatable about the spindle. Plate 24 is nonrotatably connected to the spindle. The center of member 22 defines the center of the XY coordinate system for the entire structure.

Figure 2:
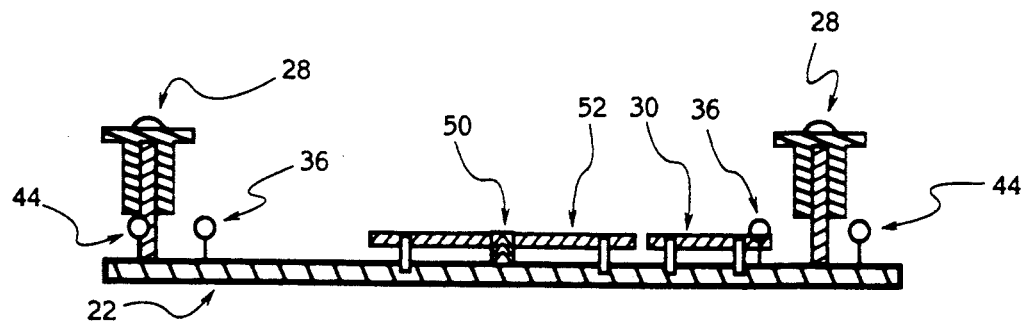
FIG. 2 is a side view of the stationary support and associated structure.
Figure 3:
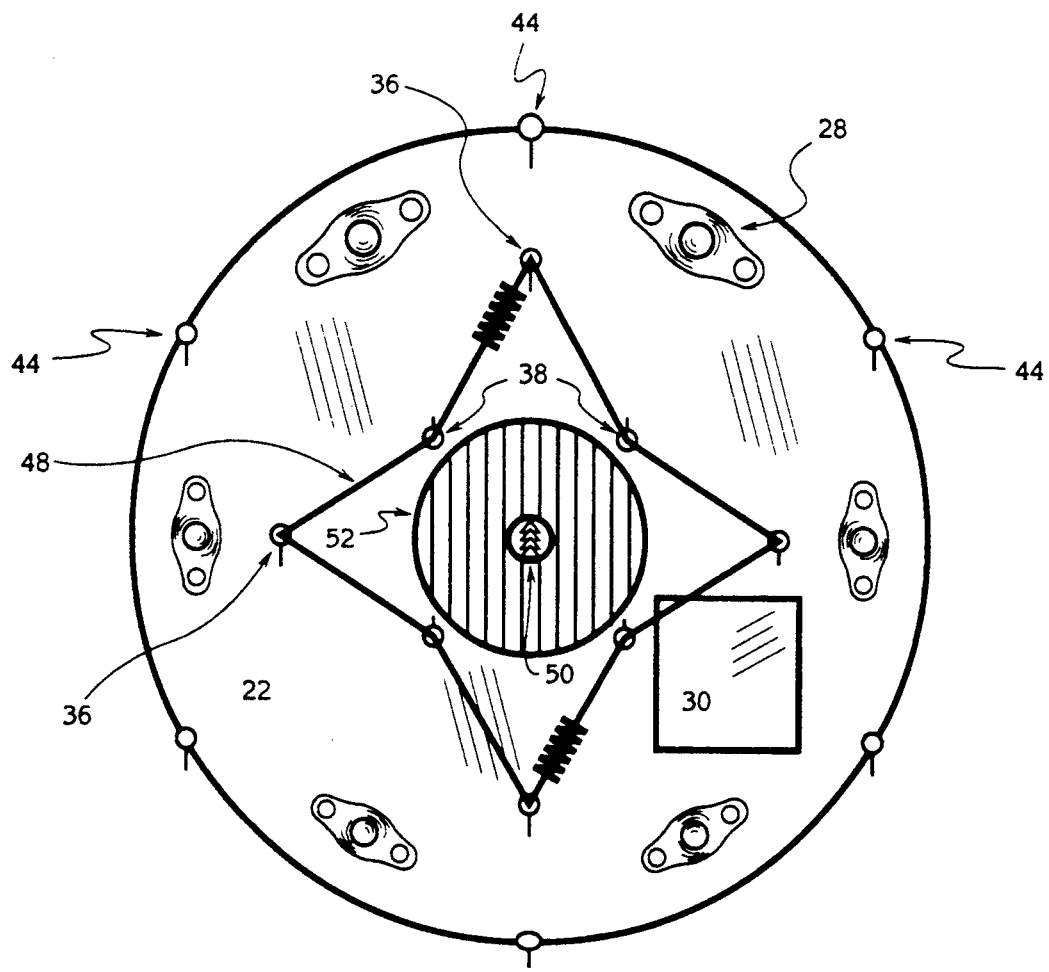
FIG. 3 is a top view of the structure shown in FIG. 2.

As shown in FIGS. 2 and 3, member 22 supports caster bearings 28, eye hooks 44 for tension network to plate 26, eye hooks 36 for tension network to plate 24, and a circular plate 52 carrying lines parallel to the Y axis. Plate 52 has a central opening in which optical transmitter-receiver 50 is disposed.

Figure 4:
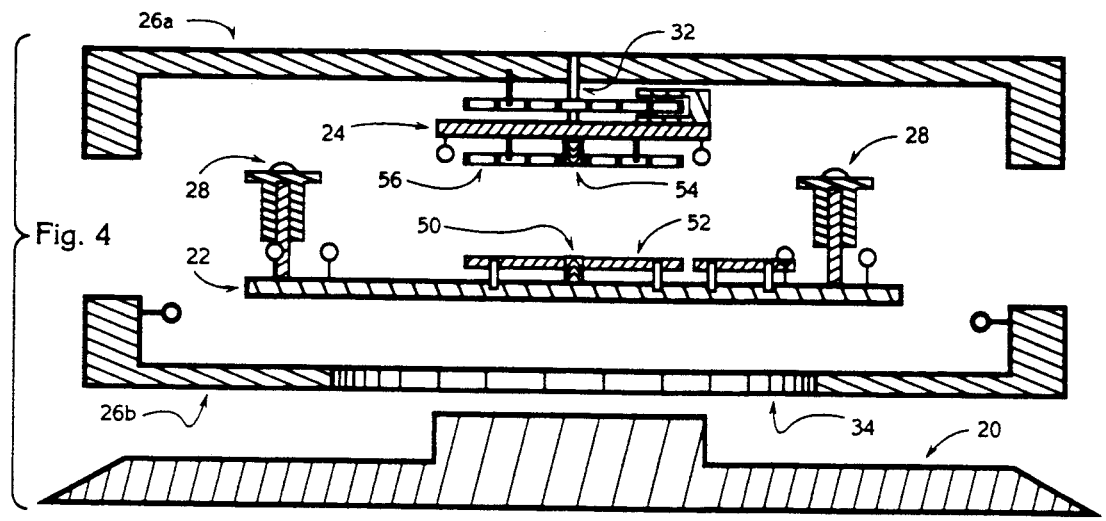
FIG. 4 is an exploded view of all of the plates, stationary member and associated structure as used in the preferred embodiment.
Figure 5:
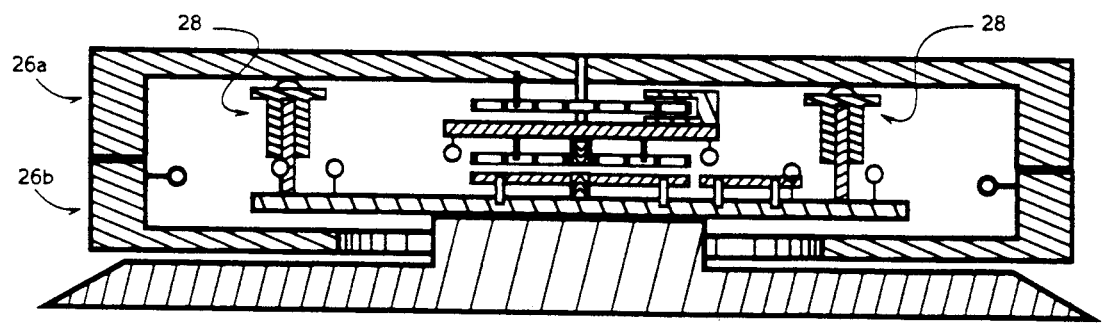
FIG. 5 is an assembled cross sectional side view of the arrangement of FIG. 5 as shown in home position.
Figure 6:
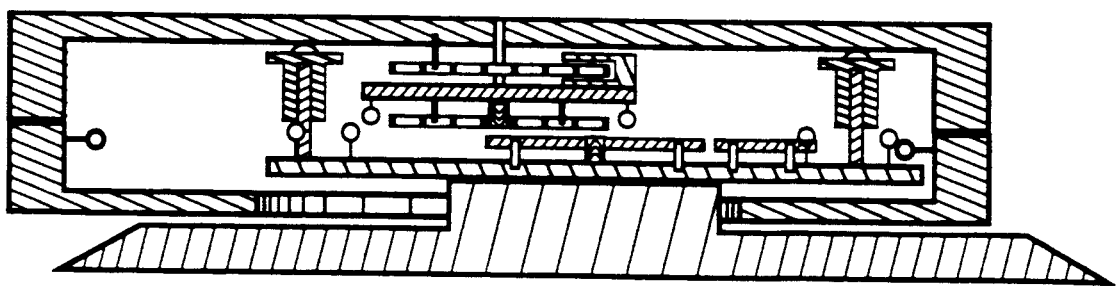
FIG. 6 is a view similar to FIG. 5 but showing the arrangement in off center position.

As shown in FIGS. 4–6, plate 26 has upper and lower mating halves 26a and 26b which together define a hollow cylinder. Half 26b has a large circular opening 34 through which extends a pedestal 20. Member 22 is supported on pedestal 20. Because of the opening 34, plate 26 together with plate 24 can move freely in the XY plane. Plate 26 is freely rotatable about spindle 32 since the spindle is journalled within a bearing. Plate 24 is secured to the spindle. FIGS. 4–6 also show the lower plate assembly which is shown in more detail in FIGS. 7–9.

Figure 7:
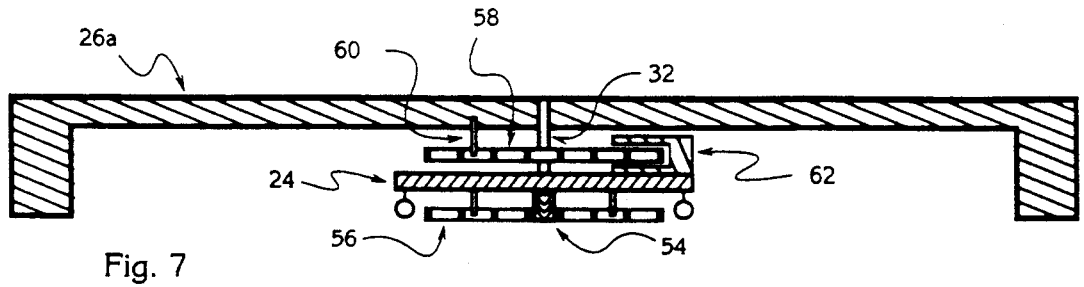
FIG. 7 is a cross sectional side view of the top plate assembly.
Figure 8:
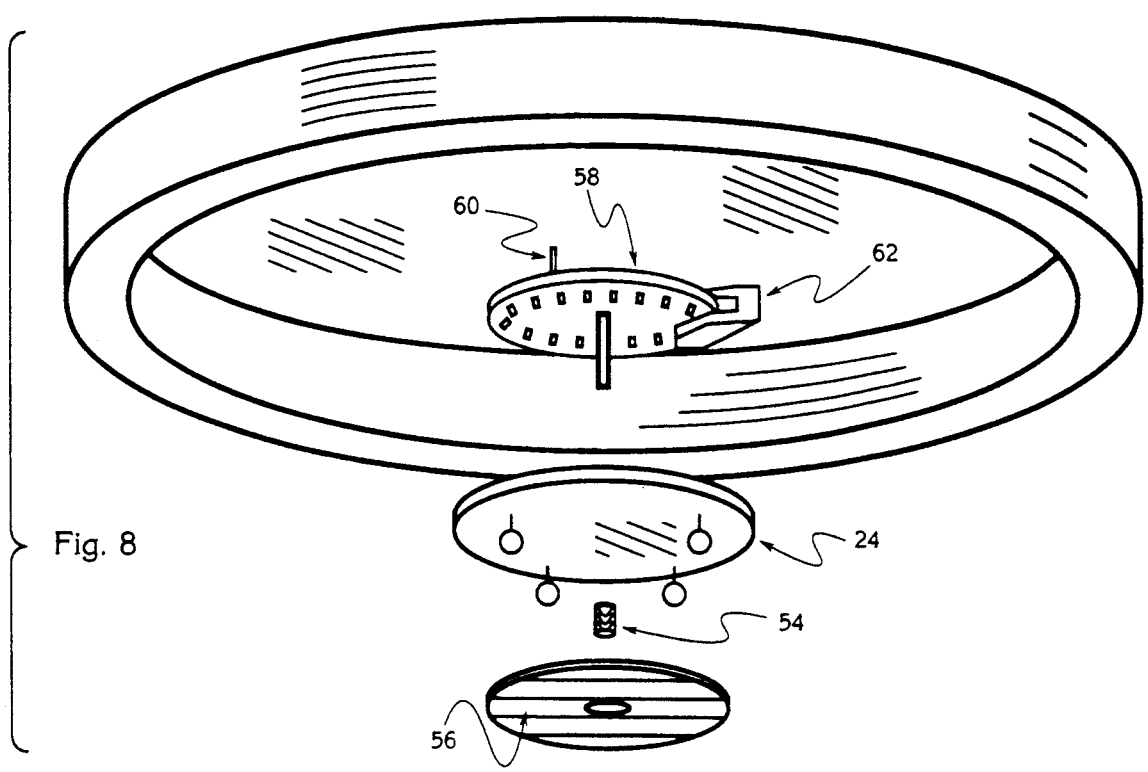
FIG. 8 is a perspective view of the assembly of FIG. 7.
Figure 9:
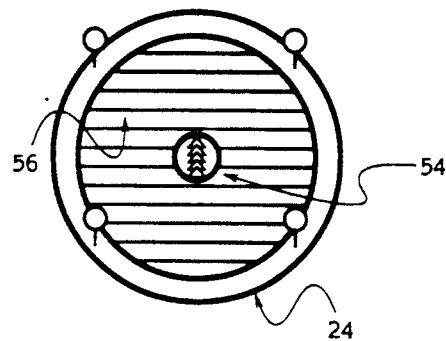
FIG. 9 is a bottom view of the top plate shown in FIGS. 7 and 8.

As shown in FIGS. 7–9, an optically encoded circular plate 56 is attached at its center to the center of the lower surface of plate 24. Plate 56 has a central opening in which an optical transmitter-receiver 54 is disposed. A disc 58 centered on the spindle and rotating therewith has spaced apart peripherally disposed openings for tracking rotation. A vertical support 60 secures disc 58 to plate 26a to prevent relative rotation of disc and plate. A unit 62 has a slot through which the disc is rotated with a light source 63 disposed adjacent the top surface of the slot and a photodector 65 disposed adjacent the bottom surface of the slot.

Figure 10:
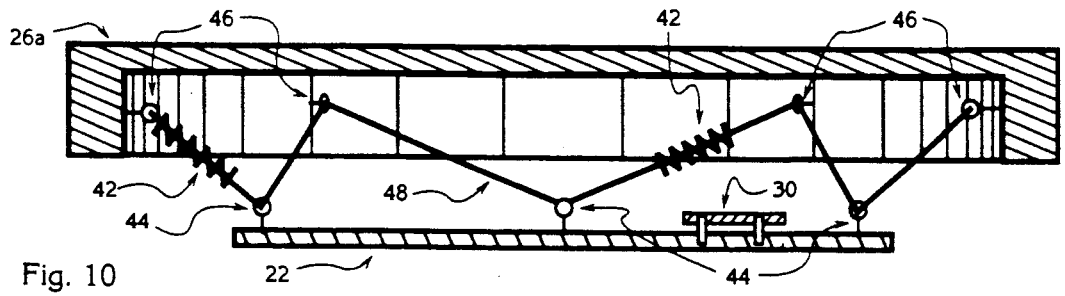
FIG. 10 is a cross sectional side view of the connecting spring network for the member and top plate.
Figure 11:
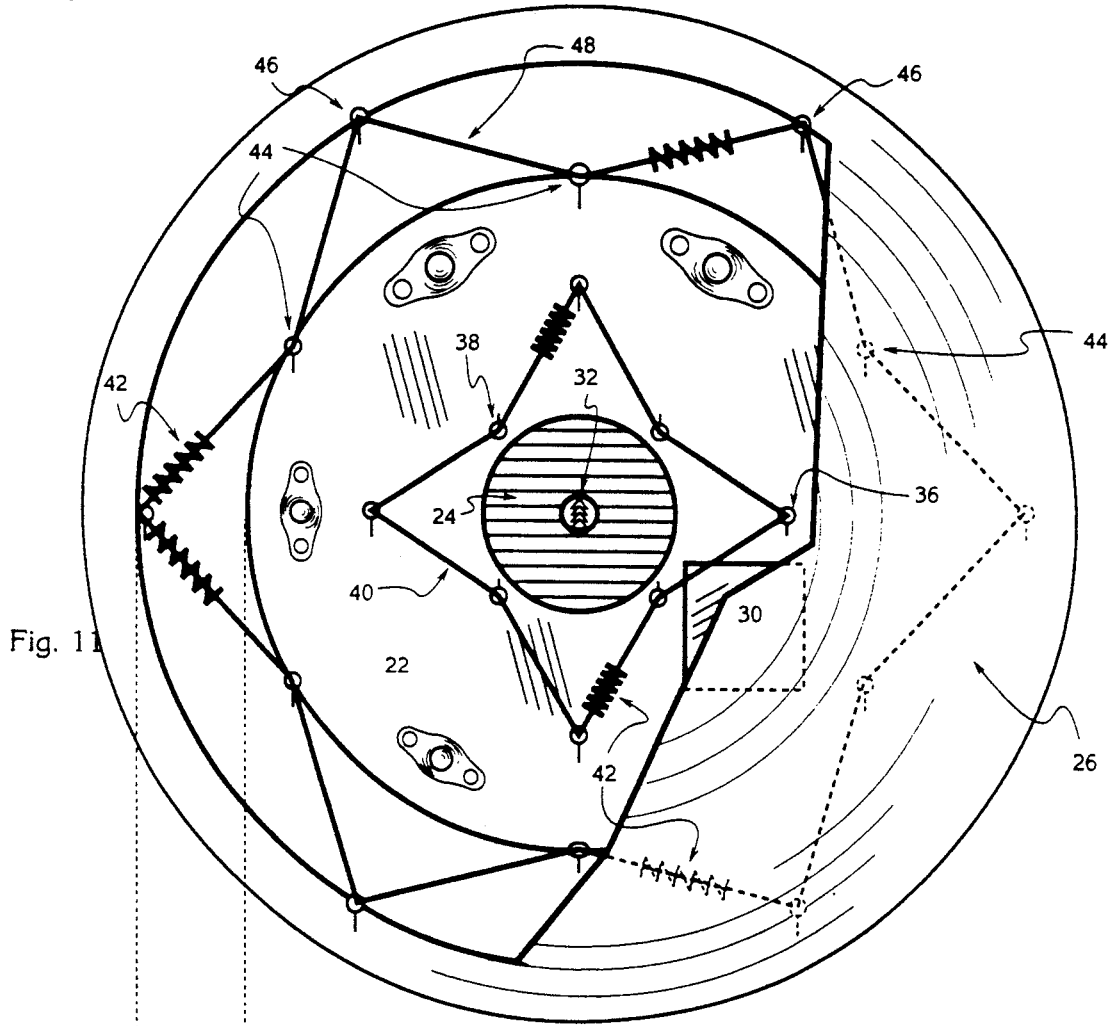
FIG. 11 shows both spring networks.
Figure 12:
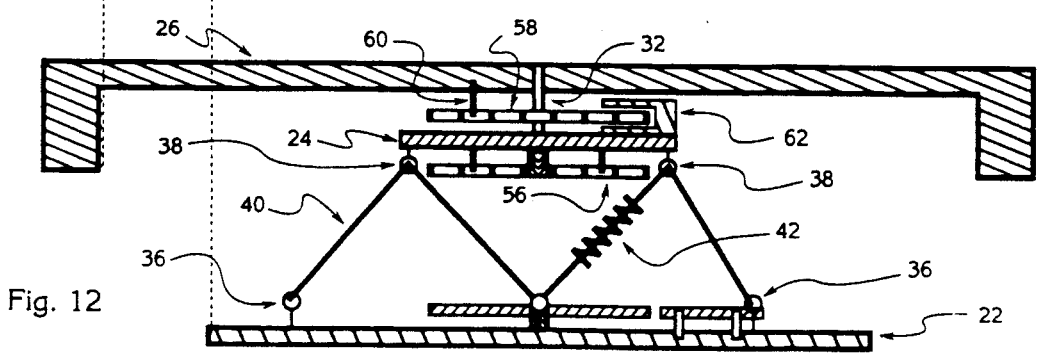
FIG. 12 is a top view of the connecting spring network for the member and the center plate.

As shown in FIGS. 10–12, there are two tension wire networks and springs used in interconnecting the plates and member. The first network 48 is connected between eye hooks 46 on half 26a and eye hooks 44 on member 22. Both ends of the wire are connected by springs 40. If necessary, other parts of the wire strand can be separated at certain other points by additional springs. The second wire network 40 is connected between hooks 38 on plate 24 and hooks 36 on member 22.

The network 48 serves to bring plate 26 to home position when the operator releases or lets go of plate 26 and yet does not exert too much pressure to make difficulties for the operator. The network 40 restricts the motion of the plate 24 to the horizontal plane and prevents rotation of the spindle.

Figure 13:
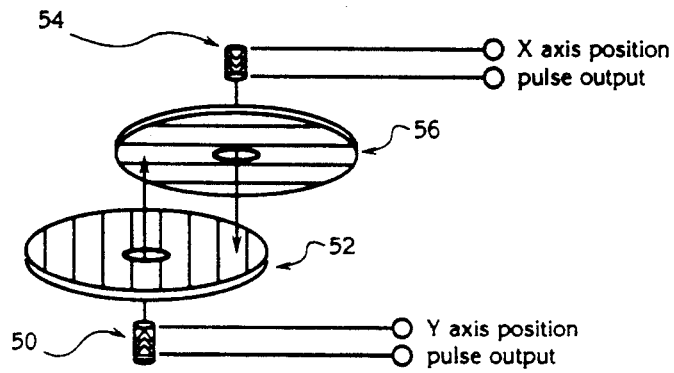
FIG. 13 illustrates diagrammatically the production of position signals for X and Y axes.

The transmitter-receiver units 50 and 54 have top light emitting sections and bottom photocell receiving sections. Each unit functions by directing light, in the case of unit 50 upon plate 56, and in the case of unit 54 upon plate 52. The manner in which the light is reflected from the plate or film back to the appropriate photocell receiving section enables the production of the various positional signals. The acceleration signals are derived from the positional signals. More particularly, as shown in FIG. 13, both plates 52 and 56 carry parallel equidistantly spaced light reflective lines. They are rotated at right angles relative to each other so that plate 56 carries lines parallel to the X axis and plate 52 carries lines parallel to the Y axis. Initially when the plates and member are in home position, light directed from the light source onto the opposite plate surface does not strike any reflective line. However, with movement along either or both X and Y axes, the light strikes the appropriate lines and the reflected light causes the appropriate photodetector to produce pulses, the number of pulses being identical to the number of lines, and thus designating the distance moved as a position signal. If either one of the units 50 or 54 is removed or disconnected, the position signals can be used to designate distance moved along only one of the X and Y axes rather than designates distance moved along both axes.

Figure 14:
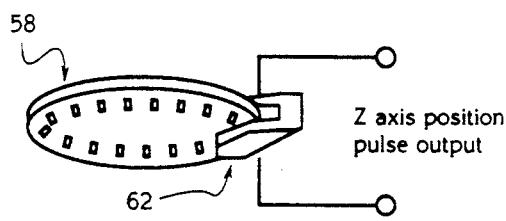
FIG. 14 illustrates diagrammatically the production of position signals for Z axis.

FIG. 14 illustrates the generation of the rotation along the Z axis. This structure is also shown in FIG. 9. Disc 58 is centered on spindle 32 which defines the Z axis.

Figure 15:
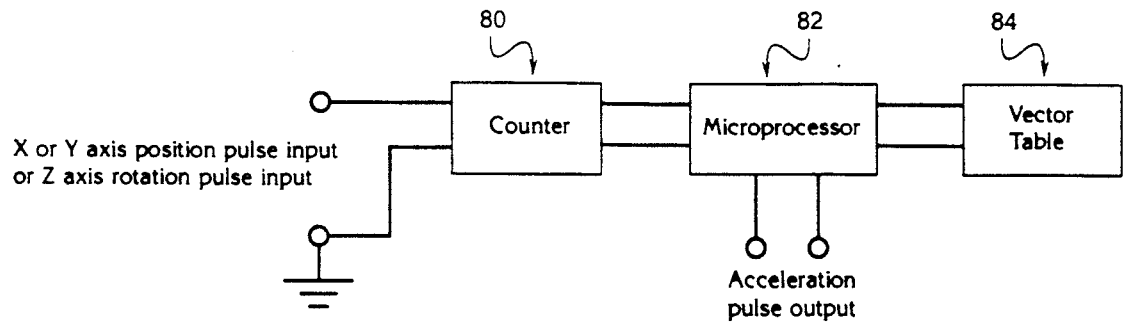
FIG. 15 is a block diagram of the system for converting position signals to acceleration signals.

FIG. 15 illustrates a system for converting position signals designated by the number of pulses to acceleration signals. Three identical systems are used, one for each axis. As a position signal represented by a number of pulses is received, a counter 80 counts the number of pulses and produces a coded output identifying the number of pulses. This output is fed to a micro processor 82. A vector table memory unit 84 contains a conversion table which identifies a different acceleration output signal in pulse form for each position signal, the acceleration signals being monatonically related to the position signals, so that as the position increases, the acceleration signal also increases. The micro processor requests the memory unit to identify the acceleration signal corresponding to the position signal supplied to the micro processor and then produces the signal so identified.

As shown in FIG. 14, as disc 58 is rotated, a light beam between the light source and the detector is interrupted when a solid portion of the disc passes therebetween and passes between the source and the detector when a hole in the disc passes therebetween. The number of pulses enables a positional signal to be produced. An acceleration signal is derived from the positional signal using the system shown in FIG. 15.

A switch on the controller when not depressed holds all values at zero. The inclusion of this function allows for sudden stops and more tolerance for error in moving the plate to center. It also enables the operator to relax the foot when no motion is desired since, without the switch, any movement of the operator's foot might cause undesirable cursor movement.

While the invention has been described with particular reference to the preferred embodiment and the drawings, the protection sought is to be limited only by the terms of the claims which follow.

What is claimed is:

1. A dimensional continuous motion controller device including structure comprising:
   a stationary flat horizontal support member lying in a first horizontal plane and having an active circular area with a center point which defines a zero point of intersecting orthogonal X and Y axes lying in the first plane;
   a first flat horizontal plate disposed above and spaced from the member and lying in a second horizontal plane, the first plate being movable along either or both X and Y axes lying in the second plane which are vertically aligned with the corresponding X and Y axes of the member, the first plate having an active circular area with a center;
   a second flat horizontal plate disposed above and spaced from the first plate and lying in a third horizontal plane, the second plate being freely movable in a horizontal plane along either or both X and Y axes lying in the third plane which are vertically aligned with the corresponding X and Y axes of the member, the second plate having an active circular area with a center and being rotatable about a vertical axis, the Z axis, which extends through the centers of the first and second plates, the second plate having a home position at which the center of the second plate is vertically aligned with the center point and at which the angle of rotation is at 0 degrees; and
   a vertical spindle defining the Z axis and interconnecting the centers of the first and second plates, the second plate being rotatable about the spindle, the first plate being non-rotatable about the spindle, so that movement of the second plate along either or both X and Y axes in the third plane produces corresponding movement of the first plate in the second plane but rotation of the second plate about the Z axis produces no rotation of the first plate.

2. The structure of claim 1 further including first means supporting the second plate above the member in such manner that the second plate can be moved and held in any planar position with respect to any one or more of the X and Y axes and in any position of rotation about the Z axis by an operator in an almost frictionless manner.

3. The structure of claim 2 further including second means connected to said second plate for automatically returning the second plate to home position as soon as the operator releases the second plate.

4. The structure of claim 3 further including third means coupled to the first plate and the member to produce a first signal which is monotonically related to any displacement of the center of the first plate from the center point of the member along the X axis.

5. The structure of claim 4 further including fourth means coupled to the first plate and the member to produce a second signal which is monotonically related to any displacement of the center of the first plate from the center point of the member along the Y axis.

6. The structure of claim 5 further including fifth means coupled to the second plate to produce a third signal which is monotonically related to any degree of angular rotation of the second plate about the Z axis as measured from the home position.

7. The structure of claim 6 further including sixth means responsive to the first signal to produce a fourth signal monotonically related to an acceleration value proportional to the amount of displacement along the X axis.

8. The structure of claim 7 further including seventh means responsive to the second signal to produce a fifth signal monotonically related to an acceleration value proportional to the amount of displacement along the Y axis.

9. The structure of claim 8 further including eighth means responsive to the third signal to produce a sixth signal monotonically related to an acceleration value proportional to the amount of angular rotation about the Z axis.

10. The structure of claim 1 further including at least one tension network interconnecting the first plate and the member to restrict the motion of the first plate to movement in the second plane and prevent rotation of the first plate about the Z axis.

11. The structure of claim 10 further including second means coupled to both the first plate and the member to produce a first signal which is monotonically related to the displacement of the center of the first plate from the center point of the member along the X axis and a second signal which is monotonically related to the displacement of the center of the first plate from the center point of the member along the Y axis.

12. The structure of claim 10 further including second means coupled to both the first plate and the member to produce a first signals which is monotonically related to the displacement of the center of the first plate from the center point of the member along one of the X and Y axes.

* * * * *